Sept. 13, 1949.                 E. O. ROGGENSTEIN                    2,481,686
                              MOTOR DRIVEN TOY VEHICLE
Filed July 26, 1947                                         7 Sheets-Sheet 1
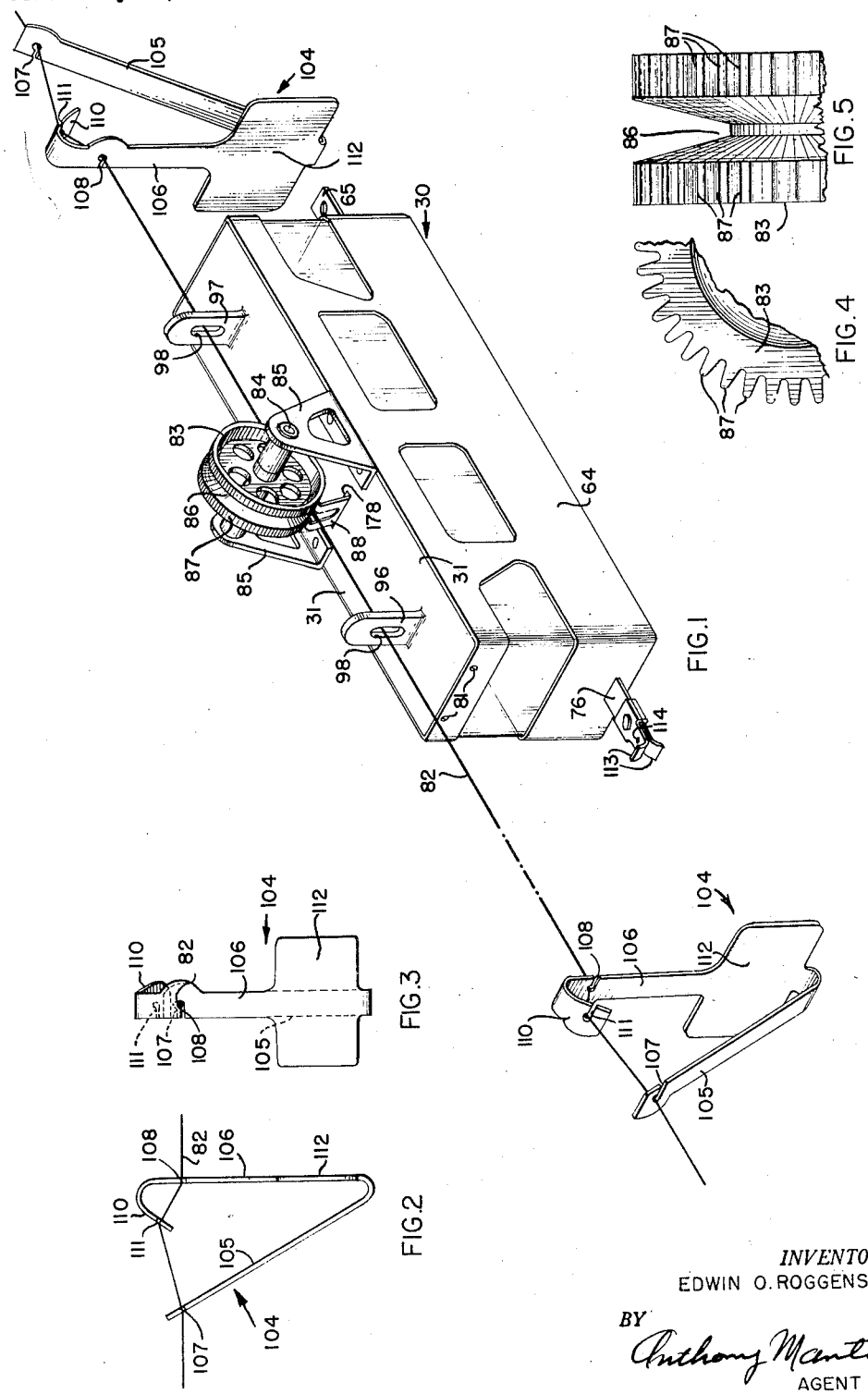
INVENTOR.
EDWIN O. ROGGENSTEIN
BY
Anthony Mantivie
AGENT Sept. 13, 1949.   E. O. ROGGENSTEIN   2,481,686
MOTOR DRIVEN TOY VEHICLE
Filed July 26, 1947   7 Sheets-Sheet 2
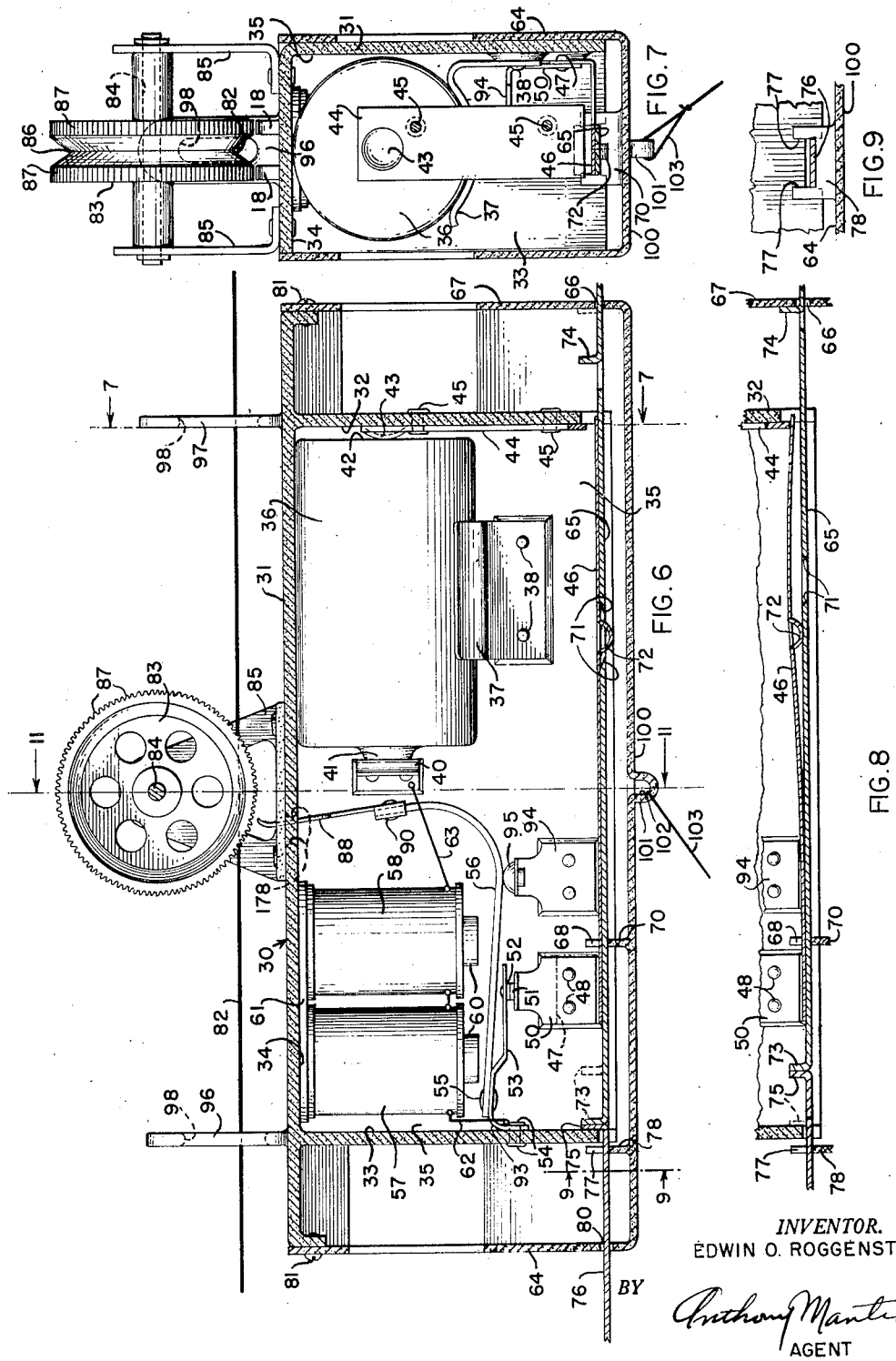
INVENTOR.
EDWIN O. ROGGENSTEIN
BY
Anthony Mantione
AGENT Sept. 13, 1949.  E. O. ROGGENSTEIN  2,481,686
MOTOR DRIVEN TOY VEHICLE
Filed July 26, 1947  7 Sheets-Sheet 3
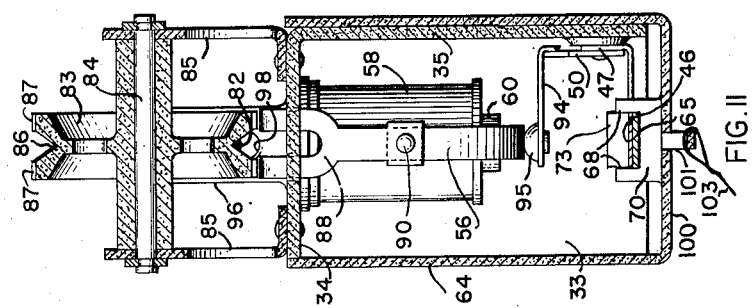
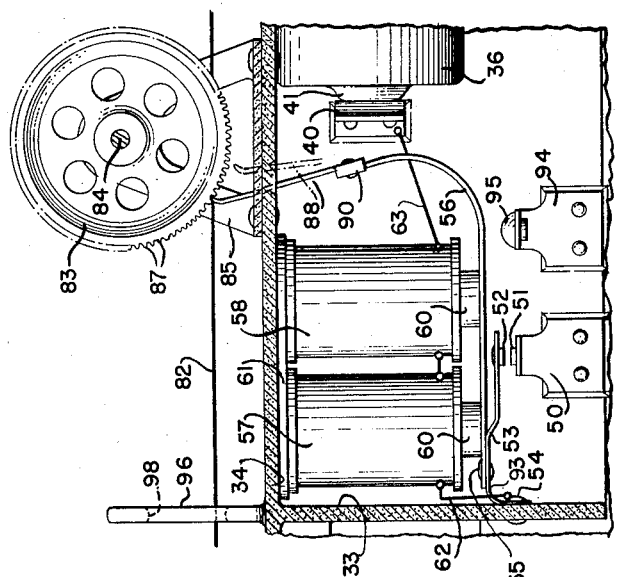
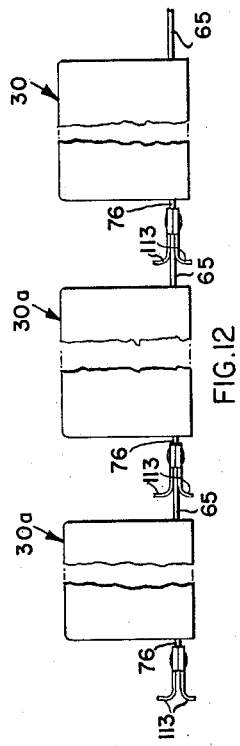
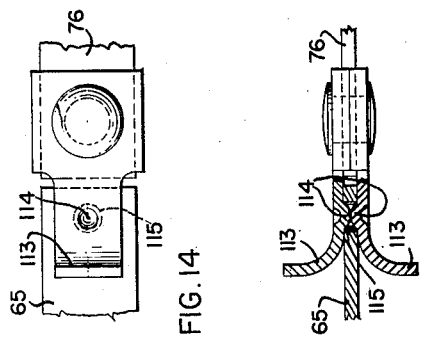
INVENTOR.
EDWIN O. ROGGENSTEIN
BY
Anthony Mantione
AGENT

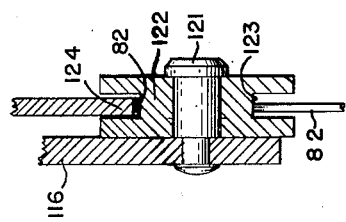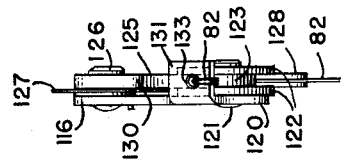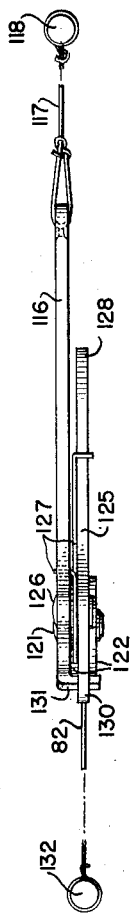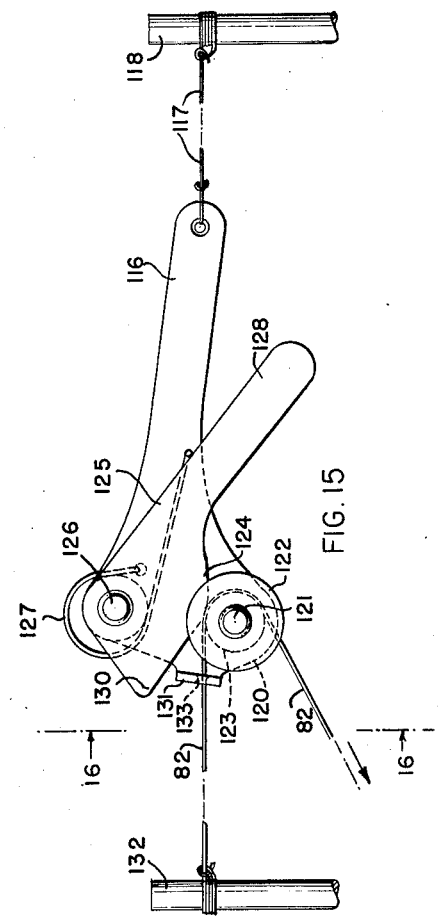

Sept. 13, 1949. E. O. ROGGENSTEIN 2,481,686
MOTOR DRIVEN TOY VEHICLE
Filed July 26, 1947 7 Sheets-Sheet 5
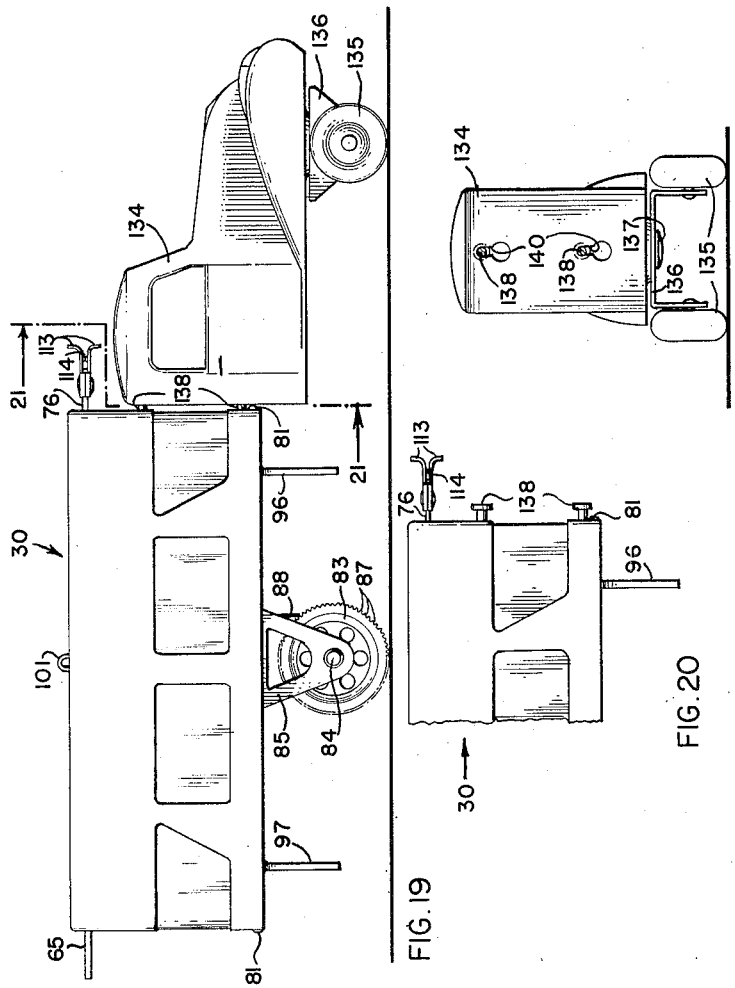
INVENTOR.
EDWIN O. ROGGENSTEIN
BY
Anthony Mantione
AGENT Sept. 13, 1949. E. O. ROGGENSTEIN 2,481,686
MOTOR DRIVEN TOY VEHICLE
Filed July 26, 1947 7 Sheets-Sheet 6
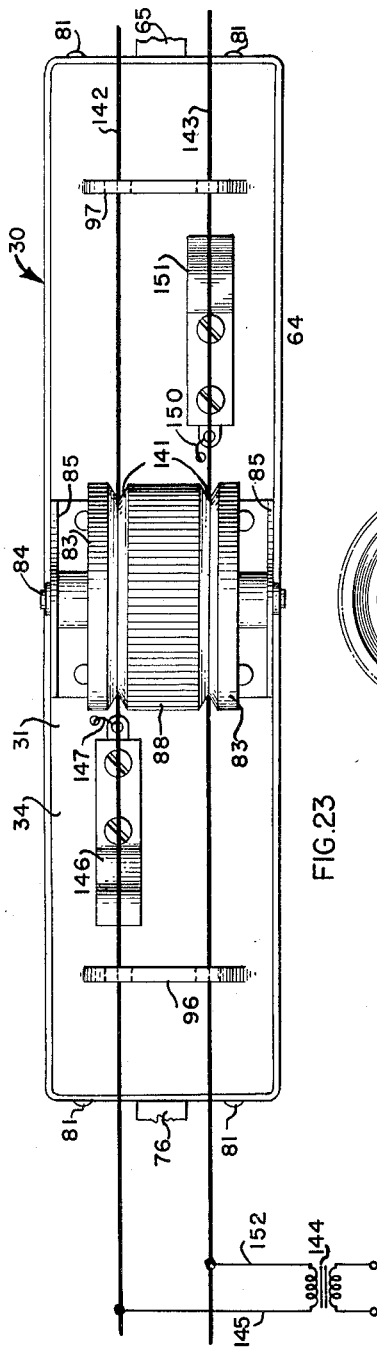
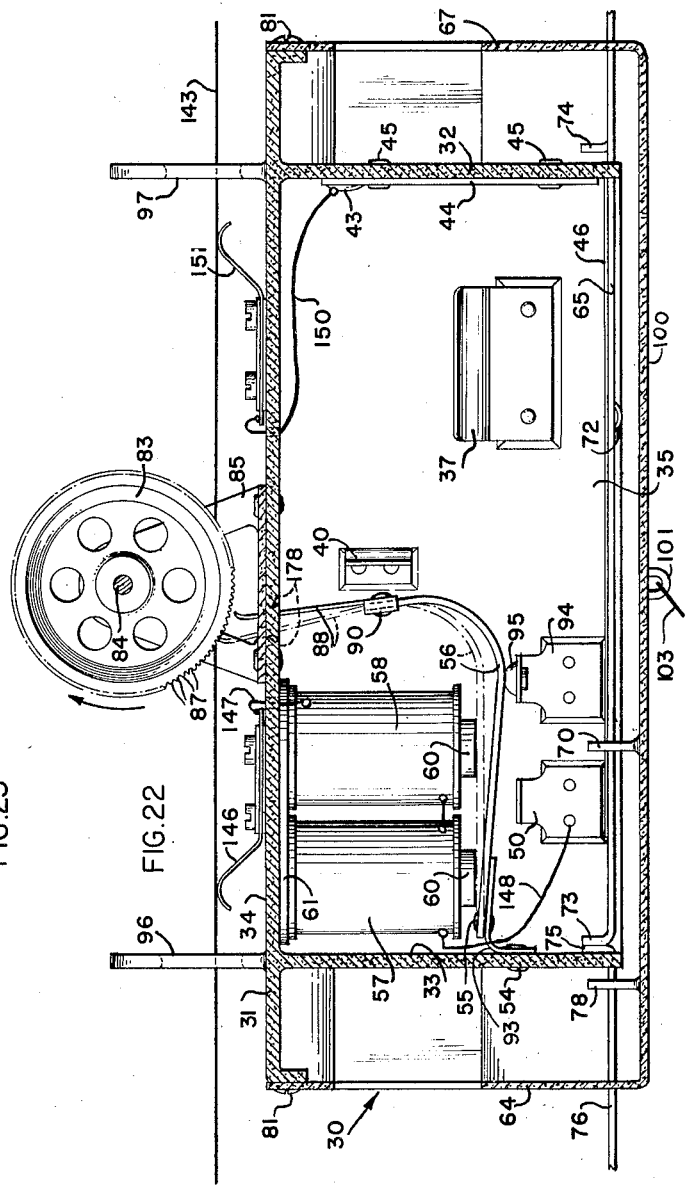
INVENTOR.
EDWIN O. ROGGENSTEIN
BY Anthony Mantione
AGENT

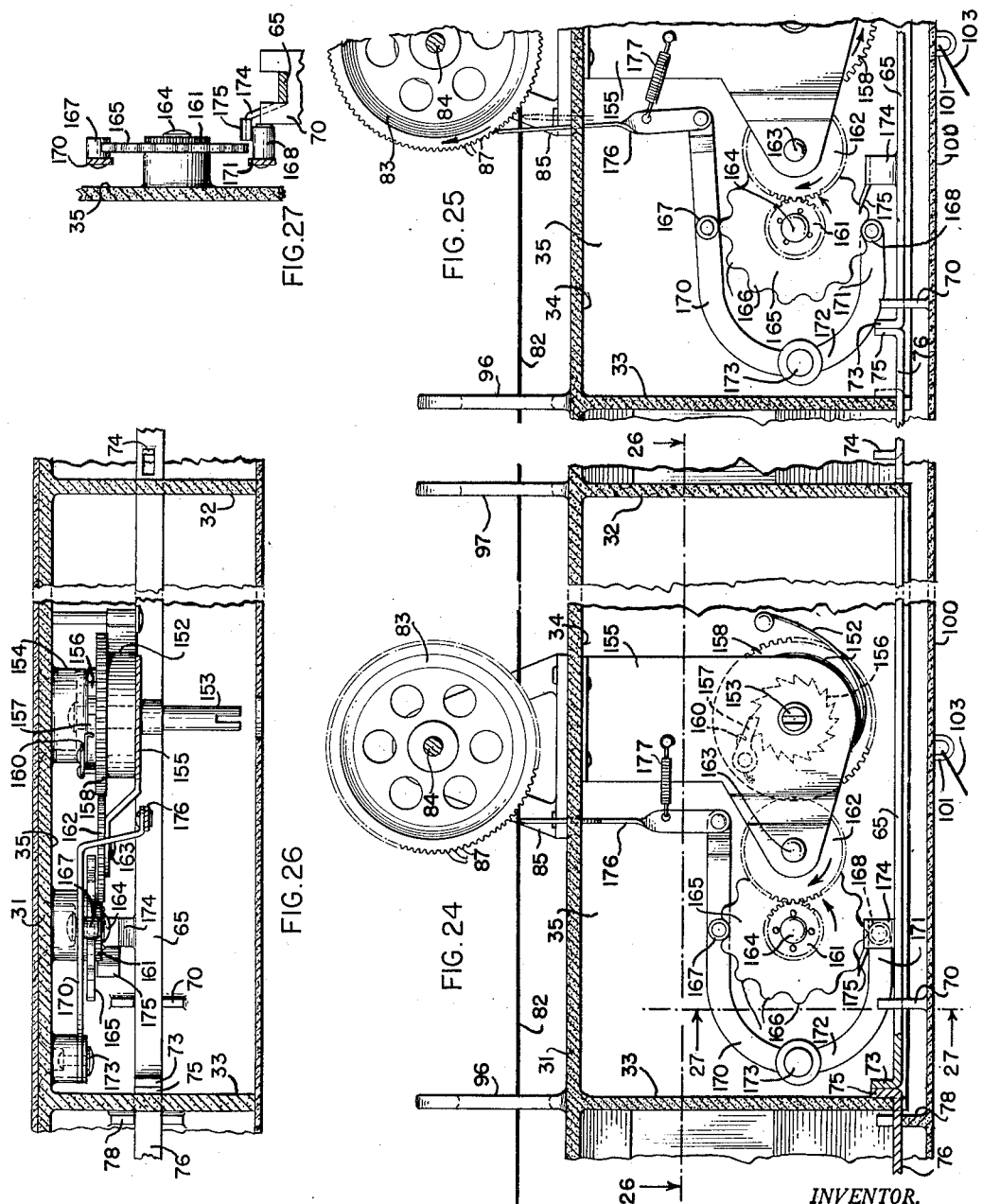

UNITED STATES PATENT OFFICE 2,481,686

MOTOR-DRIVEN TOY VEHICLE

Edwin O. Roggenstein, Ilion, N. Y., assignor, by mesne assignments, to Robert Groben, Utica, N. Y., trustee of Elec-Trick-Toy, Inc., bankrupt Application July 26, 1947, Serial No. 763,795

4 Claims. (Cl. 46—45)

This invention relates to improvements in toys and more particularly to motor driven toy vehicles of the type which operate on the ground or, if desired, upon suspended cables.

Heretofore, vehicular toys have been made incorporating mechanical motors of such designs as to require much manual handling to operate. Accordingly, the life of such toys is considerably reduced while the usage thereof is limited to those old enough to properly operate them. This condition is more obvious when considering toy motors of the spring-drum type whereby only those children who have attained a certain age and certain strength would be capable of winding the motor. Also, due to the nature of the principle of operation involved in such motors, the mechanism is of such short duration that oftentimes the toy is not worth its purchase price.

Attempts have also been made to produce vehicular toys incorporating electrical motors. These attempts have also failed because, due to the bulk and weight of such motors, its operating power in a toy vehicle is rendered negligible. Also, the size of such motors would prohibit incorporating the motor into the average sized toy vehicle body and a housing embodying such motor would correspondingly be so large as to greatly increase the cost of such vehicle. In addition, the present day toy vehicle has another disadvantage in that the motor is directly geared to the drive wheels thereby locking the vehicle against free manual movement in either direction.

Furthermore, the fascination toward toy vehicles incorporating either electrical or mechanical motors has been found to be limited to those which are adapted to travel solely on the ground, or, to those which are adapted to travel solely on a suspended cable depending upon its structural design. Up to the present time no successful attempt has been made in the art to increase the fascination toward toy vehicles by increasing its versatility so as to enable the operation of the vehicle either on the ground or on a cable, as desired, without changing the principle of operation of its motor.

Therefore, the principal object of this invention is to obtain a simple, inexpensive, and more easily operable toy motor for use in toy vehicles.

Another object of this invention is to obtain a toy motor of such design as can be easily incorporated within toy housings of various sizes and shapes.

Still another object of this invention is to obtain a toy motor which, when effective, positively rotates a drive element and, when ineffective, permits said drive element to be rotated independent of the motor.

A further object of this invention is to alternately render a toy motor effective and ineffective automatically.

A still further object of this invention is to obtain a simple and inexpensive motor operated toy vehicle capable of traveling on the ground.

Another object of this invention is to obtain a simple and inexpensive motor operated toy vehicle capable of traveling on a suspended cable.

Still another object of this invention is to obtain a motor operated toy vehicle which, due to its versatility, is capable of traveling on the ground or on a suspended cable, as desired, without changing the principle of operation of its motor.

A further object of this invention is to enable simple and efficient tightening of the cable to a desired tautness.

An object of this invention is to enable automatic forward and rearward travel of a toy vehicle upon a suspended cable.

Another object of this invention is to obtain a toy electric motor capable of operating on A. C. or D. C. current as desired.

Other objects and structural details will be apparent from the following description when read in connection with the accompanying drawings in which:

Fig. 1 is an isometric view showing the motor vehicle suspended upon a cable and the stop clamps for automatically rendering the motor effective and ineffective.

Fig. 2 is a side elevational view of a stop clamp suspended on the cable;

Fig. 3 is a side elevational view of Fig. 2;

Fig. 4 is a partial enlarged side view of the drive pulley disclosing the arrangement of the teeth along the periphery thereof;

Fig. 5 is a partial enlarged front elevational view of Fig. 4;

Fig. 6 is a longitudinal cross sectional view just inside the vehicle housing and disclosing a battery operated vibrator motor and its associated drive pulley;

Fig. 7 is a right hand cross sectional view taken along the lines 7—7 of Fig. 6;

Fig. 8 is a partial detail view disclosing the switch bar in operated position for rendering the motor effective;

Fig. 9 is a cross sectional view taken along the lines 9—9 of Fig. 6 and disclosing the guide means for the switch bar;

erated vibrator motor in driving position;

Fig. 11 is a left hand cross sectional view taken along the lines 11—11 of Fig. 6;

Fig. 12 is a schematic view disclosing three vehicles together;

Fig. 13 is a partial cross sectional detail view of a coupling unit;

Fig. 14 is a top plan view of Fig. 13;

Fig. 15 is a side elevational view disclosing the cable tightener in its effective tightening position;

Fig. 16 is a left hand cross sectional view taken along the lines 16—16 of Fig. 15;

Fig. 17 is a top plan view of Fig. 15;

Fig. 18 is a detail cross sectional view of the tightener pulley and cam in gripping engagement with the cable;

Fig. 19 is a side elevational view of the vehicle in an upside down position and coupled to a car cab for travel on the ground;

Fig. 20 is a partial detail view of the right hand portion of the vehicle housing disclosing the connecting studs for engagement with the car cab;

Fig. 21 is a cross sectional view taken along the lines 21—21 of Fig. 19 disclosing the manner in which the studs on the cable car fit into slots in the car cab body;

Fig. 22 is a side elevational view just inside the vehicle housing and disclosing the A. C. operated vibrator motor;

Fig. 23 is a top plan view of Fig. 22;

Fig. 24 is a side elevational view taken just inside the housing and disclosing a mechanical vibrator motor in normal position for driving the pulley wheel;

Fig. 25 is a partial side view similar to Fig. 24 but disclosing the motor in operated position;

Fig. 26 is a cross sectional view taken along the lines 26—26 of Fig. 24; and

Fig. 27 is a cross sectional view taken along the lines 27—27 of Fig. 24 and disclosing the mechanism for rendering the mechanical motor effective and ineffective.

The cable tightening device shown, described, but not claimed herein will be shown, described and claimed in a divisional application.

*Battery operated motor and housing*

Referring particularly to Figs. 1, 6 and 7, the motor vehicle disclosed herein is in the form of a cable car generally designated by the reference numeral 30 and includes a motor housing 31 preferably of a suitable non-conducting material. The housing 31 is provided with front and rear walls 32 and 33, respectively, a top wall 34 and one side wall 35.

The preferred form of electric motor used in connection with the present invention is that of the vibrator type which utilizes current obtained from any standard flash light battery such as that indicated by the reference numeral 36. The battery 36 is removably mounted and held firmly within the housing 31 by means of a clamp 37 suitably secured at 38 to the side wall 35. Also secured to the side wall 35 is a forwardly extending terminal member 40 adapted to contact the plus terminal 41 of the battery 36. The terminal member 40 is of spring-like conducting material so as to resiliently urge the battery 36 to the right (Fig. 6), in a manner to firmly engage the minus terminal 42 of battery 36, with a raised portion 43 formed in an upright switch element 44 suitably secured at 45 upon switch element 44 extends downwardly and is adapted to be engaged at its lower end by the rear portion of a spring switch 46 (see also Fig. 8). The spring switch 46 extends leftwardly (Fig. 6) and is provided at its left hand end with an upwardly extending lug 47 fixed at 48 to the side wall 35 of the housing. Also fixed at 48 and located between the lug 47 and the side wall 35 is a right-angled bracket 50 provided with a contact 51. The contact 51 is adapted to cooperate with another contact 52 secured to the right hand end of a rightwardly extending spring member 53, the left hand portion of which extends downwardly and is secured at 54 to the rear wall 33. Secured at 55 to the top face of the spring member 53 is a rightwardly extending magnet armature 56 adapted to be attracted by a pair of serially connected electro-magnets 57 and 58. The upper end of the cores 60 of the electro-magnets 57 and 58 are suitably secured to a bracket 61 which is in turn secured to the bottom face of the top wall 34. The other end of the coil of the electro-magnet 57 is connected by wire 62 to the spring member 53 and the other end of the coil of the electro-magnet 58 is connected by wire 63 to the terminal member 40. In order to effect attraction of the magnet armature 56, current is accordingly supplied to the electro-magnets 57 and 58, as follows: from plus side of battery 35, through terminal member 40, through wire 63, through electro-magnets 57 and 58, wire 62, spring member 53, contacts 52 and 51 (when closed), bracket 50, spring switch 46, switch member 44 (when contacted by spring switch 46), thence, back to the minus side 42 of battery 35. Attraction of the magnet armature 56 (against the tension of spring member 53) by the electro-magnets 57 and 58 causes contacts 51 and 52 to break, thereby opening the motor circuit just described. The spring member 53 then takes effect to urge the magnet armature 56 downwardly away from the cores 60 of the electro-magnets 57 and 58 until the contacts 51 and 52 are again closed establishing the circuit as before. It will be seen, therefore, that as long as the spring switch 46 is in contact with switch element 44, the magnet armature 56 reciprocates vertically in accordance with the making and breaking of the contacts 51 and 52.

The housing 31 may be completely enclosed, except for its top wall 34, within an outer housing or shell 64 (Fig. 1), also of any suitable non-conducting material, and of a design in accordance with the particular application to which the present invention is adapted. Accordingly, while the shell 64, disclosed herein, is of such design as to simulate a vehicle for scenic travel, it will be understood that the present invention may be used in connection with a shell simulating other various designs for travelling toys, as desired, without departing from the spirit of the present invention. In addition, it will be seen that the shell 64 may be dispensed with by providing the housing 31 with outer walls simulating designs of any desired type of vehicle.

The present invention provides means whereby the spring switch 46 may be moved into and out of contact with the switch element 44, either manually or automatically, so as to close and open the circuit to the electro-magnets 57 and 58. Referring to Figs. 6, 7, 8, and 9, the present invention provides a longitudinally extending switch bar 65 which is supported and guided for lateral sliding movement, at its right hand end, in a slot 66 in the front wall 67 of the shell 64. The left hand end of the switch bar 65 is supported and guided for lateral sliding movement within an open slot 68 (Fig. 8) in an upright bracket member 70 formed integral with the bottom wall of the shell 64. It will be noted that the switch bar 65 is assembled, within its respective slots 66 and 68, during the time that the shell 64 is disassembled from the housing 31. The switch bar 65 is provided with a slot 71 which, when the shell 64 is assembled with the housing 31, is adapted to receive an embossed portion 72 formed in the spring switch 46. The above construction is such that normally, the switch bar 65 is in its full leftward position (Fig. 6) in which its slot 71 receives the embossed portion 72 on the spring switch 46. In this position, the spring switch 46 lies substantially flat upon the switch bar 65 and the forward (right hand Fig. 6) portion thereof is out of contact with the lower end of the switch element 44. When the switch bar 65 is moved manually or automatically (as will hereinafter be described), to the right, as shown in Fig. 8, the embossed portion 71 on the spring switch 46 is cammed upwardly to bring the forward end of the spring switch 46 into contact with the switch element 44. The arrangement of the slot 71 and the embossed portion 72 is such that the relative movement thereof is greater than is necessary to close the gap between the spring switch 46 and the switch element 44. Accordingly, the tension applied to the spring switch 46 is sufficient to assure a more definite contact between it and the switch element 44.

The switch bar 65 is limited in its leftward and rightward movements by means of upwardly extending lugs 73 and 74, respectively, formed on said switch bar. When the switch bar 65 is moved to the right (Fig. 8), the lug 74 thereon limits against the front wall 67 of the shell 64 and when the switch bar 65 is moved to the left, the lug 73 limits against an upwardly extending lug 75 formed on the right hand end of a leftwardly extending auxiliary switch bar 76. Both lugs 73 and 75 are limited in their leftward movement by the rear wall 33 of the housing 31. The auxiliary switch bar 76 is supported and guided for lateral sliding movement, at its right hand end within an open slot 77, in an upright bracket member 78 formed integral with the bottom wall of the shell 64. The left hand end of the auxiliary switch bar is supported and guided for lateral sliding movement in a slot 80 in the rear wall of the shell 64. It will be noted the auxiliary switch bar 76 is also assembled within its respective slots 77 and 80 during the time that the shell is disassembled from the housing 31. The above construction is such that rightward movement of the auxiliary switch bar 76 will in turn move the switch bar 65 to the right thereby establishing a contact between the spring switch 46 and the switch element 44. However, it will be seen that leftward movement of the auxiliary switch bar 76 does not disturb the rightward position of the switch bar 65. The reason for providing this construction will be apparent hereinafter. It will be seen from the foregoing that the housing 31 has mounted thereon all the elements included in the motor while the shell 64 has mounted thereon the two switch bars 65 and 76. In assembling the two structures the housing 31 is inserted within the walls of the shell 64 which shell is then securely fastened to the housing 31 by means of screws 81.

Referring to Figs. 1 and 6, the cable car 30 may be supported for substantially horizontal or inclined movement upon a suitable cable 82 by means of a pulley 83 securely mounted upon a shaft 84. The shaft 84 is journalled at its ends in a pair of upright bearing brackets 85 secured to the top wall 34 of the housing 31. The periphery of the pulley 83 is provided with an annular V shaped groove 86 the surface of which is suitably roughened for obtaining better traction with the cable 82. The cable 82 may also have a suitable roughened surface so as to obtain better traction with the pulley 83.

Referring, now, more particularly to Figs. 4, 5 and 7, the periphery of the pulley 83 is ridged in a manner to form teeth 87, located at either side of the groove 86. The teeth 87 of the pulley 83 are adapted to cooperate with the upper forked ends of a downwardly extending resilient drive arm 88, which arm is secured at 90 to the upper portion of the downwardly and leftwardly (Fig. 6) extending armature 56. The leftward end of the armature 56 may be adjustably secured, at 55, to the upper face of the spring member 53. By means of the adjustment 55 the drive arm 88 may be adjustably moved rearwardly and forwardly relative to the pulley teeth 87 so as to obtain a desired cooperation between the teeth and the forked ends of the drive arm 88.

In operation, normally, i. e., when the electromagnets 57 and 58 are not energized, the forked ends of the drive arm 88 are completely out of contact with the teeth 87 of the pulley wheel 83. In this position, the cable car 30 may be moved along the cable 82 in either direction without impedance inasmuch as the pulley wheel 83 is free to rotate. When the switch bar 65 is moved to the right (Fig. 6) either manually or automatically, (as will hereinafter be described, the switch spring 46 is raised into contact with switch member 44 thereby closing the motor circuit and energizing the electromagnets 57 and 58. Immediately, the magnet armature 56 is attracted, against the tension of the spring member 53, thus bringing the forked ends of the drive arm 88 into contact with the teeth 87 of the pulley 83. Continued upward movement of the magnet armature 56 will cause the drive arm 88, which is now in contact with the teeth 87, to rotate the pulley in a clockwise direction along the cable 82. It may be mentioned at this point that the upward movement of the drive arm 88 is along an arcuate path about the pivot 93 of the spring member 53. This construction assures a positive drive of the pulley wheel 83, each time the magnet armature 56 is attracted.

As was stated above, when the magnet armature 56 is attracted, upon energization of the electromagnet 57 and 58, the contacts 51 and 52 are broken thereby opening the circuit to the electromagnets. The spring member 53 will now be effective to return the magnet armature 56 and the drive arm 88 to their normal lowered position. During this downward movement of the drive arm 88, the forked ends thereof will wipe past the teeth of the pulley 83 so that no reverse rotation of the pulley is effected. It will be seen from the above, that, as long as the spring switch 46 is in contact with the switch element 44, the magnet armature 56 and the drive arm 88 reciprocate vertically thereby continuously rotating the pulley wheel 83 in a clockwise direction.

Means are herein provided for limiting the downward movement of the spring member 53 and the magnet armature 56 thereby preventing ferring to Fig. 6, the side wall 35 of the housing 31 has secured thereto a right angle bracket 94 upon which is fixedly supported a buffer 95 of a suitable resilient material such as rubber. The buffer 95 serves to absorb the shock of the magnet armature 56 when said armature returns to its lowered position. It will be noted that the buffer 95 being of resilient material also serves to initial a return upward movement of the armature thereby decreasing the distance of travel of the armature to the electro-magnets 57 and 58 (when energized). It is obvious, therefore, that the operation of the motor is correspondingly increased.

In order to prevent lateral displacement of the pulley 83 from the cable 82 and in order to guide the longitudinal travel of the pulley along said cable, a pair of front and rear guide members 96 and 97 are provided which are formed integral with the top wall 34 of the housing 31. The guide members 96 and 97 are each provided with an elongated slot 98 through which the cable passes.

*Manual operation of cable car*

It may be desired, at times, to move the cable car 30 manually along the cable 82 without the use of the motor. In order to facilitate this manual movement of the car from one end of the cable to the other, the bottom wall 100 of the shell 64 is provided with a downwardly extending embossed portion 101 having a slot 102 to which one end of a string 103 may be attached. By means of this string 103 the operator may pull the car, in either direction along the cable, any desired distance. It will be recalled, however, that the cable 82 may be suspended at a suitable incline in which case the operator may first pull the car up the incline and then permit it to roll down the incline back to its original starting position. This process may be repeated as often as desired.

*Automatic stopping and starting mechanism*

It will be noted that, when the circuit to the electro-magnets 57 and 58 is closed, as hereinbefore described, the pulley wheel 83 is positively driven in a clockwise direction so as to advance the cable car 30 up the incline (to the right, Fig. 6) of the cable 82. Also, it will be noted that, when the circuit to the electro-magnets 57 and 58 is open, the pulley wheel 83 is free to rotate in either direction thereby permitting the cable car 30 to roll down the incline of the cable 82 toward its original starting position.

In order to effect automatic travel of the cable car 30 up and down the incline of the cable 82 and repeat the process as long as desired, means are provided herein whereby the motor circuit may be automatically closed, when the car is at the base of the incline and automatically opened, when the car has reached the top of the incline.

Referring to Figs. 1, 2, and 3, the means for effecting the automatic opening and closing of the circuit to the electro-magnets 57 and 58 includes a pair of similarly constructed stops 104 which may be adjustably fastened at any position along the cable 82 in accordance with the predetermined distance within which the cable car is to travel. The stops 104 are substantially V shaped and are provided with a pair of arms 105 and 106 each having slots 107 and 108, respectively, for receiving the cable 82. The arm 106 extends upwardly beyond its slot 108 and is bent inwardly and downwardly to form another arm 110, which arm is also provided with a slot 111. The slot 111 is located slightly above the horizontal plane of cable 82 in a manner to take up any slack of that portion of the cable within the arms 105 and 106. The above arrangement is such that with the stops 104 so positioned on the cable 82, they will form a limit for the to and fro travel of the cable car 30. The lower portion of each arm 106 is provided with an enlarged stop portion 112 adapted to be contacted by its associated switch bar 65 or 76.

Assuming, now, that the cable car 30 is located at the base of the incline of the cable 82 and the switch bar 65 is manually moved to the right (Fig. 8) so as to establish the circuit for the electro-magnets 57 and 58. When the circuit is thus established, the drive arm 88 reciprocates vertically as hereinbefore described, so as to drive the pulley wheel 83 in a clockwise direction thus causing the cable car 30 to travel up the incline (to the right, Fig. 6) of the cable 82. The cable car 30 will travel along the cable until the switch bar 65 contacts the stop portion 112 of its corresponding stop 104 (see also Fig. 1). Further movement of the switch bar 65 being limited by the stop portion 112 will cause the switch bar 65 to move leftwardly (Fig. 6) relative to the cable car 30 until the embossed portion 72 of the spring switch 46 engages the slot 71 of the switch bar 65. In this position the spring switch 46 is out of contact with the switch element 44 thus opening the circuit to the electro-magnets 57 and 58 whereby the pulley wheel 83 is free to rotate in either direction as hereinbefore described. It will be noted that leftward movement of the switch bar 65 is limited by the lug 73 thereon striking against the rear wall 33. Immediately upon the release of the pulley wheel 83, the cable car 30 is free to roll down the incline of the cable 82 (leftwardly) until the left hand end of the auxiliary switch bar 76 strikes against its corresponding stop portion 112 of the stop 105. This will cause the switch bar 76 to move to the right (Fig. 9) relative to the housing 31 thereby moving the switch bar 65 to the right until it is limited in its rightward movement by the lug 74 striking against the front wall 67 of the shell 64. When the switch bar 65 is thus moved to the right it cams the spring switch 46 upwardly to again establish a circuit to the electro-magnets 57 and 58.

It will be seen from the above that the stops 104, in cooperation with the switch bar 65 and the auxiliary switch bar 76 automatically act to alternately open and close the circuit to the electro-magnets 57 and 58. Thus, with the stop 104 properly positioned on the cable 82, the cable car 30 is capable of moving positively up the incline of the cable 82, when the motor circuit is closed, and then roll down the incline of the cable when the motor is open. It is understood that once the motor circuit is manually closed, at the start of the operation, the cable car 30 automatically moves up and down the incline of the cable 82 until the motor circuit is again manually opened at the end of the operation. Suitable locking means (not shown) may be employed for retaining the switch bar 65 and the auxiliary switch bar 76 in their leftward position whereby the motor circuit remains open at the end of the operation.

*Automatic car coupling mechanism*

The present invention provides means whereby several auxiliary cable cars 30a may be coupled in chain fashion so as to have the effect of a train travelling along the cable 82. The auxiliary cars 30a may or may not be of the same general apperance as the cable car 30 and may or may not include the vibrator motor. However, it does include the pulley wheel 83 and the auxiliary switch bar 76 and the switch bar 65. The pulley wheel 83 and the switch bars 76 and 65 used in the auxiliary cars 30a are similar to those used in the cable cars 30.

Referring particularly to Figs. 12, 13, and 14 the left hand end of each auxiliary switch bar 76 has suitably secured thereto a pair of leftwardly extending resilient coupling members 113 having inwardly extending extrusions 114 formed thereon which are adapted to be received in openings 115 in the right hand end of its corresponding switch bar 65. The coupling members 113 are rounded at their left ends to facilitate inserting of its corresponding switch bar 65. The construction is such that the right hand end of each switch bar 65 may be inserted between the corresponding pair of coupling members 113 until the switch bar is snapped in place by means of the extrusions 114 and the opening 115. The cars 30 and 30a may be uncoupled by applying slight manual pressure to extract the switch bar 65 from the coupling members 113.

In the automatic operation of the coupling mechanism, let us assume an auxiliary car 30a is placed at the base of the incline of the cable 82. It will be understood of course that each of the switch bars 65 are provided with openings 115. When the cable car 30 has reached its limit of travel up the incline of the cable and has then rolled down to the base of the incline, the coupling members 113 on the auxiliary switch bar 76 contact the switch bar 65 associated with the auxiliary car 30a and lock said switch bar in coupled engagement, as shown in Fig. 13. At the same time, the auxiliary switch bar 76 and the switch bar 65 of the cable car 30 move to the right, as hereinbefore described, to close the circuit for the electro-magnets 57 and 58 thereby enabling the cable car 30 and the auxiliary car 30a to start their travel up the incline of the cable. The cars thus coupled may travel up and down the incline as long as desired as hereinbefore described in connection with the cable car 30. It will be noted at this time, that the lugs 75 and 73 are not connected to each other. This is for the reason that when the switch bar 65 is in the "on" position, i. e., to the right (Fig. 8) the auxiliary car 30a coupled to its associated auxiliary switch bar 76 does not cause a dragging action against the switch bar 65 so as to accidentally move said switch bar, to the left, thereby opening the motor circuit.

The construction is such that during the initial movement of the cable car 30 up the incline of the cable, the auxiliary switch bar 76 and its associated auxiliary car 30a do not move until the rear housing wall 33 of the car picks up the lug 75 of the switch bar 76 and consequently the auxiliary car 30a.

*Cable tightener*

The present invention provides simple means whereby the cable 82 may be suspended at a desired tautness with a minimum amount of operations. Referring particularly to Figs. 17, 15, and 16, the cable tightening means consists of a bracket plate 116 to the right hand end of which is secured one end of a short cable or string 117. The other end of the string 117 may be secured to any suitable fixed support 118 such as a door knob, upright posts, etc. The bracket plate 116 is provided with a depending ear 120 having a stud 121, fixed thereto, upon which is rotatably mounted a pulley wheel 122. The pulley wheel 122 is provided with an annular groove 123 for receiving a cam portion 124 formed on a cam lever 125 which lever is mounted for rotation upon a stud 126 fixed to the bracket plate 116. A spring 127 having one end connected to the bracket plate 116 and the other end connected to the cam lever 125 serves to constantly urge the cam lever 125 in a clockwise direction (Fig. 15) whereby the cam portion 124 presses against the inner periphery of the groove 123. The cam lever 125 is provided with an arm or finger piece 128 whereby the cam lever may be manually rocked counter clockwise against the tension of the spring 127. An arm 130, formed integral with the cam lever 125, is adapted to cooperate with a lug 131, on the bracket 116, in a manner to limit the counter clockwise rotation of the lever 125. The construction is such that when the cam lever 125 is rocked to its full counter clockwise position the cam portion 124 remains within the walls of the groove 123.

In operation, the left hand end of the cable 82 is secured to any suitable support 132 such as a door knob, upright posts etc. The cam lever 125 is then, through finger piece 128, rocked counter clockwise until it is limited in such movement by the arm 130 striking against the lug 131, thereby forming a gap between the cam portion 124 and the inner periphery of the groove 123. With the parts in this position the right hand end of the cable 82 is fed through an opening 133, in the lug 131, and then through the gap between the cam portion 124 and the inner periphery of the groove. When the cable 82 is thus fed around the pulley 122, the cam lever 125 is released, whereby the cam lever snaps back to its clockwise position under tension of the spring 127. This causes the cam portion 124 to resiliently press against the cable 82. It will be seen that, if the right hand end of the cable 82 is now drawn to the left, in the direction of the arrow (Fig. 15), the cable will wipe past the periphery of the cam portion 124. This is due to the fact that the cam portion 124 is substantially eccentric to its pivot 126 and, in feeding the cable in this direction the cam lever 125 is urged slightly counterclockwise to bring its lower portion of the cam 124 into cooperation with the cable 82 and pulley 122. However, when the cable is released and pressure applied to reverse the direction of its feed, the cam lever 125 will rock slightly clockwise whereby the higher portion of the cam 124 is brought into cooperation with the cable 82 and the pulley 122 thus causing the cable to be gripped between the pulley and the cam. Obviously, as the pivots for the pulley 122 and cam lever 125 are fixed neither of them can rotate to cause slackening of the cable 82.

When it is desired to slacken or remove the cable 82 from the pulley 122 the cam lever 125 is rotated counterclockwise as above described whereby the cable may be easily removed.

*Cable car operation on ground*

In order to increase the versatility of motor operated toy cars, the present invention provides means whereby the cable car 30 is also capable of travelling on the ground as an alternative to travelling along a suspended cable 82, as hereinbefore described.

Referring particularly to Figures 19, 20, and same as has been described in connection with the suspended cable 82, is shown in an upside down position wherein the pulley wheel 83 is resting on the ground. The cable car 30 is supported and guided for to and fro movement along the ground by means of a cab 134 of any suitable design such as might be used for land vehicles. The cab 134 is provided with two front wheels 135 mounted for rotation upon a bracket 136 which bracket may be adjustably pivoted at 137 so as to effect any desired direction of travel of the combined cab 134 and car 30. The means for connecting the car 30 to the cab 134 includes a pair of headed studs 138 securely mounted upon the right hand side of the car 30 (Figure 20), which studs cooperate with slots 140, formed in the rear portion of the cable 134, so as to effect a locking action between the car and the cab.

In operation, if it is desired to run the cable car 30 along the ground instead of along the cable 82, it is only necessary to remove the car from the cable and placing the car on the ground in an upside down position with the pulley wheel 83 resting on the ground. The cab 134 is then, through the studs 138 and slots 140 placed in locked engagement with the car 30. If necessary, the bracket 136 is then adjusted in accordance with the direction the car and cab are to travel. The motor, within the car 30, for rotating the pulley wheel 83 is started and stopped in the same manner as hereinbefore described, i. e., leftward movement of the auxiliary switch bar 76 starts the motor and rightward movement of the switch bar 65 stops it.

From the above, it is obvious that, if it is desired to run the cab 30 on the cable 82, instead of on the ground, it is only necessary to disengage the car and cab and place the pulley 83 upon the cable 82 and proceed as hereinbefore described.

A. C. vibrator motor

The present invention has been, hereinbefore, described in connection with a vibrator motor operating on D. C. current. While it may, at times, be preferable to operate the above vibrator motor on D. C. current it may, at other times, however, be desirable to dispense with the necessity of replacing a battery each time the old one has been used up. Accordingly, the present invention provides means whereby the vibrator motor may be operated on A. C. current.

The A. C. vibrator motor to be presently described, herein, is substantially the same, in structure, arrangement, and operation, as that disclosed in connection with the battery operated motor. Therefore, all elements common to both motors will be identified by like reference characters while uncommon elements will be identified by unlike reference characters.

Referring particularly to Figs. 22 and 23, the pair of electro-magnets 57 and 58 are adapted to be energized and deenergized to thereby effect a substantially vertical reciprocatory movement of its armature 56. This causes the drive arm 88, secured thereto, to engage the teeth 87 of the pulley wheel 83 to thereby rotate the pulley wheel in a clockwise direction, as hereinbefore described. The pulley wheel 83 is provided with a pair of suitably roughened annular grooves 141 whereby the cable car 30 may be supported and guided for travel to and fro along a pair of suspended cables 142 and 143 of any suitable conducting material. It will be noted, at this time, that the cables 142 and 143 may each be suspended at an incline in the same manner as the previously described cable 82. The cables 142 and 143 cooperate with individual slots in guide members 96 and 97 to prevent possible displacement of the cable car 30.

Current is supplied to the electro-magnets 57 and 58, through the conducting cables 142 and 143, as follows: from the secondary winding of a suitable step down transformer 144 through line 145, through conducting cable 142, through leaf spring contact 146 which is suitably secured to the top wall 34 of the housing 31, through line 147, through the electro-magnets 57 and 58, through line 148, through spring switch 46, through switch element 44 when in contact with spring switch 46, through line 150, through leaf spring contact 151 which is secured to the top wall 34 of the housing 31, through conducting cable 143 and through line 152, back to the secondary winding of the step down transformer 144. It will be seen from the above that A. C. current is supplied to the electro-magnets when the spring switch 46 is moved into contact with the switch element 44. This may be done manually or automatically by shifting the switch bar 65 to the right (Fig. 22), as previously described.

The above construction is such that, by supplying A. C. current directly to the coils of the electro-magnets 57 and 58, the armature 56 vibrates vertically at a constant speed and in synchronism with the frequency of the line voltage. It is well known that A. C. current flows in sine waves through the coils of an electro-magnet. On the positive maximum, the armature is attracted to the pole piece and released as the current drops to zero. The armature is again attracted on the negative alternation and released as the current drops to zero. It will be seen, therefore, that the present armature 56 will be attracted and released twice for each cycle of current. On a sixty cycle line, then, the armature 56 is attracted and released at the rate of one-hundred and twenty times a second or seventy-two hundred times a minutes.

Mechanical vibrator motor

In the foregoing, preferred forms of electrical vibrator motors were disclosed in connection with the present invention. However, it will be understood that other types of electrical or mechanical vibrator motors may be used in connection with the present invention without departing from the scope thereof.

Referring particularly to Figs. 24, 25 and 26, a preferred form of mechanical vibrator motor is shown, whereby the pulley wheel 83 may be rotated for travel along the cable 82, in a manner previously set forth in connection with the A. C. and D. C. motors. It will be recalled that the A. C. or D. C. motor operates in a manner to cause substantially vertical reciprocation of its associated drive arm 88 whereby the pulley wheel 83 is driven in one direction. When the motor is rendered ineffective the drive arm 88 is retained in its disengaged position, with respect to its pulley wheel 83, whereby the pulley wheel may be rotated in either direction independently of the motor.

As is best seen in Figs. 24 and 25, the mechanical vibrator motor is enclosed within the housing 31, which is substantially similar to the housing previously described. The motor is powered by means of a spiral spring 152 one end of which is connected to a rotatable shaft 153 and the other end connected to the side wall 35 of the housing 31. The shaft 153 is journalled at one end in a bracket 154 extending inwardly from the side wall 35 (Fig. 26) and at the other end in a depending bracket 155 suitably secured to the top wall 34 of the housing 31. Secured to the shaft 153 is a ratchet wheel 156 adapted to be engaged by a pawl 157 pivotally mounted upon a gear 158 which gear is loosely mounted upon the shaft 153 and normally prevented from rotation, as will hereinafter be described. A spring 160 serves to constantly retain the pawl 157 in engagement with the ratchet wheel 156. The above construction is such that, with the gear 158 in its immovable condition, the spring 152 may be wound to a desired tension, by turning the shaft 153 in a clockwise direction (Fig. 24). It will be noted that, during the clockwise rotation of the shaft 153, the ratchet 156 wipes past the pawl 157. However, counter-clockwise rotation of the shaft 153, under the influence of the spring 152, is prevented by the pawl 157 which, is mounted upon the normally stationary gear 158.

The gear 158 is constantly in driving engagement with a gear 161 by means of an intermediate gear 162 mounted for rotation upon a stub-shaft 163 secured to the depending bracket 155. The gear 161 is rotatably mounted upon a stub shaft 164, secured to the side wall 35, of the housing 31, and is formed integral with an escape wheel 165. The escape wheel 165 is provided with rounded teeth 166 which cooperate with a pair of diametrically opposed follower rollers 167 and 168 mounted upon respective arms 170 and 171 of a rock lever 172. The lever 172 is mounted for reciprocatory movement upon a stub shaft 173 secured to the side wall 35 of the housing 31.

The above construction is such that normally, i. e., with the motor locked at rest in a manner hereinafter described, the roller 167 lies between two of the teeth 166, while the roller 168 lies upon the high portion of a corresponding tooth 166. It will be seen that, with the parts in the above position (Fig. 24), the rock lever 172 is at its full clockwise position. It will also be seen that, if the escape wheel 165 is rotated to a position whereby the roller 167 lies upon the high portion of a tooth 166, the roller 168 assumes a position between two of the teeth 166. With the parts in this position the rock lever 172 is at its full counter clockwise position (Fig. 25). It is obvious, therefore that, if the escape wheel 165 is permitted to rotate under the influence of the spring 152, the rollers 167 and 168 will alternately ride upon the high portion of the teeth 166 to thereby oscillate the rock lever 172.

It will be noted that the escape wheel 165, through gears 164, 162 and 158, is constantly urged in a counter clockwise direction (Fig. 24) under the influence of the spring 152. Therefore, an automatic locking device is herein provided whereby the escape wheel 165 and its associated mechanism is prevented from operating when the car is not in use. In this manner a single loading of the spring 152 can be utilized for several different runs of the car.

As previously described, the switch bar 65 used in connection with the A. C. and D. C. motors is manually or automatically operable to open and close the circuit to the electro-magnets 57 and 58. In the present instance the switch bar 65 is slightly modified but manually or automatically operable in the same manner, to lock and unlock the escape wheel 165. Referring to Figs. 24, 25, 26, and 27 the switch bar 65 has an upwardly and rearwardly extending ear 174, the upper part of which is provided with an inclined cam portion 175. The above construction is such that, normally, when the car is not operating, the switch bar 65 is in its full leftward position (Figs. 24 and 26) wherein the roller 168 is locked downwardly to prevent oscillation of the lever 172 and rotation of the toothed wheel 165. When it is desired to start the mechanical motor the switch bar 65 is moved to the right (Fig. 25) wherein the roller 168 is free of the cam 175. In this position, the toothed wheel 165 is free to rotate in a counterclockwise direction under the influence of the spring 152 thereby causing oscillatory movement of the lever 172. Operation of the motor may be stopped by moving the switch bar 65 to the left whereby the cam portion 175 engages the roller 168 and cams said roller downwardly to a locked position as above described. It is obvious, therefore, that starting and stopping of the motor may be effected as long as the spring 152 is tensioned.

In order to effect rotation of the pulley through the oscillations of the lever 172, the arm 170 of the lever extends rightwardly beyond the roller 167 and has pivoted at its right hand end a drive arm 176. The drive arm 176 is substantially similar to and operates in the same manner as the drive arm 88 previously described. A spring 177, one end of which is connected to the drive arm 176 and the other end connected to the bracket 155, serves to urge the arm 176 to the right so as to insure positive engagement of the forked ends of the drive arm with the teeth of the pulley 83, during the upward driving movement of the arm as shown in Fig. 25. The arm 176 is guided for vertical movement within a slot 178 in the top wall of the housing 31. A similar slot 178 is also provided for guiding the previously described drive arm 88. It will be noted that when the motor is locked against operation, as above described, the drive arm 176 is entirely disengaged with the pulley wheel 83 so as to permit full rotation of the pulley in either direction.

While I have described what I consider to be highly desirable embodiment of my invention, it is obvious that many changes in form could be made without departing from the spirit of my invention, and I, therefore, do not limit myself to the exact form herein shown and described, nor to anything less than the whole of my invention as hereinafter set forth, and as hereinafter claimed.

What I claim as new and desire to secure by Letters Patent is:

1. The combination with a cable; of a toy vehicle including a vibrator power source, a drive wheel normally free to rotate in either direction upon said cable, means operable under control of said power source for rotating said drive wheel in one direction, and switch means movable in one direction for rendering said vibrator power source effective to cause rotation of said drive wheel and in another direction to permit free rotation of said drive wheel independent of said power source; and means on said cable for alternately moving said switch means in opposite directions.

2. The combination with a cable; of a toy vehicle adapted to travel on said cable, said toy vehicle including a drive wheel normally in position to freely travel upon said cable in either direction, a vibrator power source, means under control of said vibrator power source for rotating said drive wheel in one direction, and switch means operable for rendering said vibrator power source effective and ineffective; a first stop means on said cable for limiting the movement of said toy vehicle in one direction and concomitantly operating said switch means for rendering said vibrator power source effective; and a second stop means on said cable for limiting the movement of said toy vehicle in the other direction and concomitantly operating said switch means for rendering said vibrator power source ineffective.

3. The combination with a cable disposed at an incline to the horizontal; a toy vehicle adapted to travel on said cable, said toy vehicle including a drive wheel normally in position to freely travel upon said cable in either direction, a vibrator power source, means under control of said vibrator power source for rotating said drive wheel in one direction, and switch means operable for rendering said vibrator power source effective and ineffective; a first stop means on said cable for limiting the movement of said toy vehicle up the incline of said cable and concomitantly operating said switch means for rendering said vibrator power source ineffective; and a second stop means on said cable for limiting the movement of said toy vehicle down the incline of said cable and concomitantly operating said switch means for rendering said vibrator power source effective.

4. The combination with a cable disposed at an incline to the horizontal, of a first toy vehicle adapted to travel to and fro upon said cable, a power source operable when effective for positively driving said first toy vehicle up the incline of said cable and when ineffective for permitting free rolling of said toy vehicle down the incline of said cable, switch means operable for rendering said power source effective and ineffective, a second toy vehicle normally disposed toward the base of the incline of said cable, coupling means associated with said switch means for automatically coupling said first and second toy vehicle upon the completion of the downward roll of said first toy vehicle and concomitantly operating said switch means for rendering said power source effective whereby said first and second toy vehicles travel up the incline of the cable together.

EDWIN O. ROGGENSTEIN.

REFERENCES CITED

The following references are of record in the file of this patent:

UNITED STATES PATENTS

| Number | Name | Date |
| --- | --- | --- |
| 760,787 | Hamilton | May 24, 1904 |
| 916,081 | Williams et al. | Mar. 23, 1909 |
| 1,195,319 | Wilbers | Aug. 22, 1916 |
| 1,198,163 | Snedeker | Sept. 12, 1916 |
| 1,290,964 | Fuller | Jan. 14, 1919 |
| 1,403,767 | Goff | Jan. 17, 1922 |
| 1,490,125 | O'Leary | Apr. 15, 1924 |
| 1,517,261 | Street | Dec. 2, 1924 |
| 1,572,124 | Baldridge et al. | Feb. 9, 1926 |
| 1,753,127 | Macklin | Apr. 1, 1930 |
| 1,828,507 | Murphy | Oct. 20, 1931 |
| 2,091,004 | Marx | Aug. 24, 1937 |
| 2,233,075 | Daily et al. | Feb. 25, 1941 |
| 2,271,968 | Creager | Feb. 3, 1942 |
| 2,272,643 | Peters et al. | Feb. 10, 1942 |
| 2,311,123 | Osborne | Feb. 16, 1943 |

FOREIGN PATENTS

| Number | Country | Date |
| --- | --- | --- |
| 153,697 | Germany | June 4, 1902 |
| 269,410 | Great Britain | Oct. 8, 1926 |
| 503,588 | Great Britain | Apr. 3, 1939 |